US011951075B2

(12) United States Patent
Wagenknecht et al.

(10) Patent No.: US 11,951,075 B2
(45) Date of Patent: Apr. 9, 2024

(54) BOTTLE TEAT AND CAP FOR A DRINKING BOTTLE

(71) Applicant: MAPA GMBH, Zeven (DE)

(72) Inventors: Uwe Wagenknecht, Tostedt (DE); Bodo Warden, Mönchengladbach (DE); Sarah-Dimple Dass, Hamburg (DE)

(73) Assignee: MAPA GMBH, Zeven (DE)

( * ) Notice: Subject to any disclaimer, the term of this patent is extended or adjusted under 35 U.S.C. 154(b) by 305 days.

(21) Appl. No.: 17/067,474

(22) Filed: Oct. 9, 2020

(65) Prior Publication Data

US 2021/0121368 A1 Apr. 29, 2021

Related U.S. Application Data

(62) Division of application No. 15/333,687, filed on Oct. 25, 2016, now abandoned.

(30) Foreign Application Priority Data

Oct. 26, 2015 (DE) ..................... 10 2015 118 252.1

(51) Int. Cl.
*A61J 11/00* (2006.01)
*A61J 11/04* (2006.01)

(52) U.S. Cl.
CPC .......... *A61J 11/006* (2013.01); *A61J 11/0015* (2013.01); *A61J 11/008* (2013.01); *A61J 11/0085* (2013.01); *A61J 11/045* (2013.01)

(58) Field of Classification Search
CPC .... A61J 11/006; A61J 11/0015; A61J 11/008; A61J 11/0085; A61J 11/045
See application file for complete search history.

(56) References Cited

U.S. PATENT DOCUMENTS 1,045,456 A 11/1912 Tatum
2,424,629 A 7/1947 Patterson
(Continued)

FOREIGN PATENT DOCUMENTS

CH 261501 7/1947
DE 3337248 A1 11/1984
(Continued)

*Primary Examiner* — Tri M Mai
(74) *Attorney, Agent, or Firm* — Eversheds Sutherland (US) LLP

(57) ABSTRACT

A bottle teat consisting of a soft elastic material for a drinking bottle, in particular for infants and small children, having:
- a teat flange,
- a hollow teat sleeve that projects upward from the teat flange and is connected at its bottom end to the teat flange,
- a hollow suction part that is connected at its bottom end to the top end of the hollow teat sleeve and projects upward therefrom,
- a dome-shaped palate-contacting region on a side of the mouthpiece facing the palate,
- at least one drinking hole in the palate-contacting region that extends from the outside to the inside of the mouthpiece, wherein:
- an elevated surface that bulges to the outside is on the outside of the palate-contacting region, and
- the at least one drinking hole is arranged in the elevated surface so that the suction part with the elevated surface can be pressed in a sealing manner against an inwardly bulging sealing surface on the inside of the cap bottom of a cap to cover the bottle teat.

16 Claims, 15 Drawing Sheets

(56) References Cited

U.S. PATENT DOCUMENTS

| | | | | |
|---|---|---|---|---|
| 2,579,184 | A | 12/1951 | Glasgow et al. | |
| 2,822,102 | A | 2/1958 | Charles | |
| 3,082,770 | A | 3/1963 | Straub | |
| 3,292,809 | A * | 12/1966 | Shomock | A61J 11/045 215/11.5 |
| 3,516,564 | A * | 6/1970 | Pohlenz | A61J 11/04 215/11.5 |
| 3,549,036 | A * | 12/1970 | Ritsi | A61J 11/008 215/11.6 |
| 3,777,753 | A * | 12/1973 | Kesselring | A61J 11/045 215/11.1 |
| 4,700,856 | A * | 10/1987 | Campbell | A61J 9/001 215/11.1 |
| 4,834,099 | A | 5/1989 | Schrooten | |
| 5,419,445 | A | 5/1995 | Kaesemeyer | |
| 5,573,507 | A * | 11/1996 | Moser | A47G 21/18 215/11.1 |
| 6,003,698 | A | 12/1999 | Morano | |
| 7,287,657 | B1 * | 10/2007 | Rodriguez | A61J 11/008 215/11.1 |
| 7,311,106 | B1 | 12/2007 | Burton | |
| D599,028 | S * | 8/2009 | Schofield | D24/196 |
| 8,403,158 | B2 | 3/2013 | Itzek | |
| 8,708,147 | B2 | 4/2014 | Hansen et al. | |
| 8,708,174 | B2 | 4/2014 | Itzek | |
| 9,724,272 | B2 | 8/2017 | Rohrig | |
| 9,730,861 | B2 | 8/2017 | Lo | |
| 11,400,025 | B2 * | 8/2022 | Roehrig | B65D 41/06 |
| 2005/0056608 | A1 * | 3/2005 | Nesin | A61J 1/2093 215/11.1 |
| 2010/0032398 | A1 | 2/2010 | Struckmeier et al. | |
| 2011/0266246 | A1 | 11/2011 | Itzek | |
| 2014/0144865 | A1 | 5/2014 | Last | |
| 2015/0142054 | A1 * | 5/2015 | Itzek | A61J 11/006 606/236 |
| 2015/0164748 | A1 | 6/2015 | Brown et al. | |
| 2016/0199262 | A1 * | 7/2016 | Itzek | A61J 11/02 215/11.1 |

FOREIGN PATENT DOCUMENTS

| | | | | |
|---|---|---|---|---|
| DE | 9318699.1 | U1 | 3/1994 | |
| DE | 202012002302 | U1 * | 8/2013 | A61J 11/006 |
| EP | 0527094 | A1 | 2/1993 | |
| EP | 1275366 | A2 * | 1/2003 | A61J 11/001 |
| EP | 2299965 | B1 | 6/2012 | |
| WO | 2005/041851 | A2 | 5/2005 | |
| WO | 2013131660 | A1 | 9/2013 | |

* cited by examiner

BOTTLE TEAT AND CAP FOR A DRINKING BOTTLE

CROSS-REFERENCE TO RELATED APPLICATIONS

This application is a divisional application from U.S. patent application Ser. No. 15/333,687, filed Oct. 25, 2016, which claims priority to German Patent Application No. 10 2015 118 252.1, filed Oct. 26, 2015, the contents of which are incorporated by reference.

The invention relates to a bottle teat and to a cap for a drinking bottle, in particular for infants and small children. The bottle teat can in particular be designed as a feeding teat or a drinking aid (such as a feeding spout or drinking spout) according to European standard EN14350-1, the entire contents of which is incorporated by reference.

Bottle teats are used to administer milk and other liquid nutrition, especially to infants and small children. They have a hollow teat sleeve which is connected at its bottom end to a teat flange. The teat sleeve is connected at the top end to a hollow suction part which projects from the teat sleeve. The suction part has at least one drinking hole which extends from the outside to the inside of the suction part. The teat flange serves to be fastened to the mouth of a container. The container in particular is a drinking bottle (feeding bottle), drinking cup or feeding bag. For fastening to a container, an attachment ring is used which has a cylindrical cover with at least one fastening element for fastening to at least one fastening element of the container. In an embodiment as a threaded ring, the fastening elements are an inner thread on the cover and an outer thread on the container. Furthermore, the fastening ring has an inward-projecting, annular-disc-shaped ring flange that overlaps the nipple flange and presses against the front edge of the mouth of the container.

Feeding teats generally consist of soft elastic material. Drinking aids and drinking spouts are often also made of soft elastic material. When suction is exerted on the suction part, a vacuum arises in the container which makes it difficult to withdraw the liquid and can cause a soft elastic bottle teat to collapse. To prevent this, bottle teats have a ventilation valve. The ventilation valve opens to equalize pressure with the surroundings when a certain vacuum predominates in the container.

Feeding bottles with a cover that is clamped on the fastening ring and covers the bottle teat are known. To prevent unintentional leakage, a sealing washer can be clamped in a sealing manner between the fastening ring, or respectively teat flange, and edge of the opening of the container. Such a feeding bottle is described in DE 33 37 248 A1, the entire contents of which is incorporated by reference.

CH 261 501 Ah, U.S. Pat. Nos. 5,419,445 A and 2,579,184A (the entire contents of each of which is incorporated by reference) describe feeding bottles with a bottle teat and cover that, in a mounted position, is seated by the inside of its bottom on the drinking hole in the center of the suction part. The bottom of the cap is concavely curved on the inside, and the teat part with the central drinking hole lies against this concave curvature.

EP 0 527 094, the entire contents of which is incorporated by reference, describes a feeding bottle with a cap that can be snapped into a groove in the outside of a threaded ring. The cap contains a flexible membrane that is securely connected to a sleeve arranged on the bottom of the cap. The membrane deforms elastically and seals the drinking hole of the bottle teat when the cap is snapped onto the threaded ring. The cap is complex and difficult to clean. With orthodontically shaped bottle teats in which the drinking hole is arranged in a side surface in the head of the suction part and is aligned at a sharp angle to the teat axis, the membrane adapts to the drinking hole after a certain bulging and provides a seal. The contact pressure of the membrane on the opening edge of the bottle teat is consequently relatively slight, and leaks can therefore occur.

EP 2 299 965 B1, the entire contents of which is incorporated by reference, describes a drinking bottle with a drinking hole in a side surface of the suction part, a fastening ring for fastening a teat flange on a bottle opening, and a cap that can be placed on the bottle teat, wherein the inside of the side wall of the cap presses in a sealing manner against the drinking hole in the side surface, and the inside of its bottom presses against an opposing side surface of the suction part aligned at a sharp angle to the midaxis of the teat flange. Sealing is difficult because the suction part must be aligned at a sharp angle to the midaxis.

Against this background, the object of the invention is to create a bottle teat for a drinking bottle, in particular for infants and small children, that enables a simple and reliable seal. Furthermore, the object of the invention is to create a cap for a drinking bottle, in particular for infants and small children, that enables an easy and safe seal.

The object is achieved by a bottle teat with the characteristics described below.

The bottle teat according to the invention consisting of a soft elastic material for a drinking bottle, in particular for infants and small children, has:

- a teat flange,
- a hollow teat sleeve that projects upward from the teat flange and is connected at its bottom end to the teat flange,
- a hollow suction part that is connected at its bottom end to the top end of the hollow teat sleeve and projects upward therefrom,
- a dome-shaped palate-contacting region on a side of the suction part facing the palate,
- at least one drinking hole in the palate-contacting region that extends from the outside to the inside of the suction part, characterized in that
- an elevated surface that bulges to the outside is on the outside of the palate-contacting region, and
- the at least one drinking hole is arranged in the elevated surface so that the mouthpiece with the elevated surface can be pressed in a sealing manner against an inwardly bulging sealing surface on the inside of the bottom of a cap to cover the bottle teat.

A simple and reliable seal is achieved by the bottle teat according to the invention in that at least one drinking hole is formed in an elevated surface that bulges to the outside on the palate-contacting region of the suction part. Consequently, the cap only slides over the elevated surface of the palate-contacting region while being mounted so that only slight friction acts between the cap and suction part, and the at least one drinking hole reliably reaches the intended position on the sealing surface of the cap. Furthermore, by pressing the elevated surface of the suction part against the cap, elevated surface pressure and hence a better seal of the drinking hole is achieved.

The bottle teat according to the invention can therefore be sealed more easily and reliably than conventional bottle teats by mounting a cap.

According to one particular design of the invention, the suction part has a flat, thin region that completely or partially includes the palate-contacting region, wherein the suction part outside of the thin region has a greater wall thickness than in the thin region. The thin region completely encloses the palate-contacting region, is designed to coincide with the palate-contacting region, or is completely enclosed by the palate-contacting region.

According to another embodiment, the suction part has a greater wall thickness everywhere at the edge of the thin region than within the thin region. According to another embodiment, the suction part has a greater wall thickness everywhere outside of the thin region than within the thin region. According to a preferred embodiment, the bottle teat has a greater wall thickness everywhere outside of the thin region than within the thin region. The suction part also preferably has the same wall thickness everywhere within the thin region.

During use, the bottle teat rests with the flat thin region on the palate. The palate has very pressure-sensitive regions, in particular in the area of the incisive papilla which is a small elevation on the front end of the palate. The flat, thin area is particularly soft and supple since it covers the surface of the palate-contacting region. Consequently, the use of the bottle teat is felt to be particularly pleasant by a child.

According to a preferred embodiment, the flat, thin region is therefore located within a palate-contacting region that, during use, comes into contact with the front region of the hard palate, preferably in a palate-contacting region which comes into contact with the incisive papilla during use. Additional advantageous embodiments of the thin region are described in WO 2013/131660 A1, the entire contents of which is incorporated by reference. The corresponding parts of this document are incorporated in the present application.

According to another embodiment, the bottle teat is designed so that it has a preferred rotational position within the mouth. This can be achieved in that the thin region is only on one side of the suction part which rests against the palate in the preferred rotational reposition. This enables a restriction of the thin area, which only slightly reduces the firmness of the suction part.

Alternatively, the bottle teat according to the invention has no preferred rotational position in the mouth. This occurs in particular with a bottle teat with a rotationally symmetric shape. In bottle teats with a rotationally symmetric shape, the thinning area is also preferably designed in a rotationally symmetric manner so that it comes to rest on the palate in any rotational position.

According to another embodiment, the suction part has a bevel for contacting the tongue on the side opposite the palate-contacting region. This brings about a preferred rotary position of the nipple teat in the mouth of the child and improves the suction process. The region of the teat that is to contact the tongue is also termed the "tongue contacting region".

According to another embodiment, the bottle teat has a waist in the connecting region between the hollow suction part and hollow teat sleeve. The waist serves to accommodate the teeth of the user and also improves wearing comfort. The region of the bottle teat against which the teeth of the user lies during use is also termed the "teeth region".

According to another embodiment, the suction part has greater dimensions in the direction of a main axis, at least in the palate-contacting region and in the teeth region in each cross-section than in the direction of a minor axis. The main axis is the axis of the cross-section that lies in a midplane of the suction part, on one side of which the palate-contacting region is arranged, and on the other side of which the tongue-contacting region is arranged. The minor axis is the axis of the cross-section that is aligned perpendicular to the main axis. The teat is preferably used in the described alignment due to this cross-sectional shape. According to another design, the cross-section is oval.

According to another embodiment, the elevated surface has a contour in the shape of an ellipse whose main axis is aligned perpendicular to the midaxis of the teat flange. This design is particularly advantageous for easily finding a reliable sealing position.

According to another embodiment, three, six or nine drinking holes are arranged in the elevated surface. The embodiments with three, six or nine drinking holes form different teat sizes which permit different flow rates. The different teat sizes can be selected depending on the age, or respectively size, of the child. Other numbers than the aforementioned numbers of drinking holes are also possible.

According to another embodiment, the at least one drinking hole is lasered. The lasered drinking hole is cut by means of a laser beam into the suction part. By cutting with the laser beam, the drinking hole has a minuscule opening without suction on the suction part, i.e., in the unstressed state of the bottle teat. However, the opening width of the gap is small enough to achieve a seal of the bottle teat from the capillary effect and surface tension of the cut surfaces sufficient enough to prevent liquid food from unintentionally exiting. The precise production of a drinking hole with a sufficiently small opening width is possible by means of a laser beam. For production, it is advantageous that the drinking hole can be generated without contact by the laser beam which permits high production speeds. It is additionally advantageous that production by the laser beam enables any desired drinking hole contours. The drinking hole can accordingly be a circular drinking hole or an elongated drinking slit. European application EP 15 150 663.1 presents further details of production and the nature of drinking holes that are produced with laser beams. The relevant statements are incorporated in this application.

According to another embodiment, the thin region has a circular contour. The contact of the circular thin region on the palate is particularly pleasant.

According to another embodiment, the elevated surface is arranged entirely within the thin region. According to another embodiment, the elevated surface is arranged at the top edge of the thin region. According to another embodiment, the top edge of the elevated surface is designed to approximately coincide with a section of the top edge of the thin region. According to another embodiment, the elevated surface is approximately one third of the thin region. These embodiments are advantageous for wearing comfort and for the seal of the bottle teat on a cap.

Furthermore, the object of the invention is a bottle teat consisting of soft elastic material for a drinking bottle, in particular for infants and small children, comprising:

a teat flange, a hollow teat sleeve that projects upward from the teat flange and is connected at its bottom end to the teat flange, a hollow suction part that is connected at its bottom end to the top end of the hollow teat sleeve and projects upward therefrom, at least one drinking hole in the suction part that extends from the outside to the inside of the suction part, characterized in that on the inside, the teat sleeve has a plurality of inwardly projecting, parallel ribs at a distance from each other around the midaxis through the nipple flange.

Preferably, this invention is another embodiment of a bottle teat from claim 1. This also applies to the special embodiments of the present invention provided below.

An advantageous flexibility of the teat sleeve is achieved by the ribs, and this facilitates an alignment of the teat sleeve to the position of the child and an adaptation to the child's mouth. At the same time, the ribs stabilize the teat sleeve which can prevent the bottle teat from collapsing into the drinking bottle under a vacuum.

According to another special embodiment of the present invention, the ribs have an elliptical contour viewed from above, wherein the main axes of the ellipses in a midplane pass through the suction part, and the suction part has the palate-contacting region on one side of the midplane, and the tongue-contacting region on the other side of the midplane. In this design, the mobility of the suction part is advantageous when the drinking bottle teat is aligned in a preferred rotary position within the mouth.

According to another embodiment, the ribs gradually flatten at opposing ends toward the midplane through the suction part. This is the midplane on the one side of which the palate-contacting region is arranged, and on the opposite side of which the tongue-contacting region of the mouthpiece is arranged. This further promotes advantageous mobility of the suction part.

According to another embodiment, the bottle teat has a wavy contour on the inside in the region of the ribs.

According to another embodiment of the present invention, the teat sleeve has an inwardly projecting cone valve which has a slit in its inner end. According to one preferred embodiment, the cone is slit in the tip end. This embodiment of the vent valve has the advantage of being sealed against shaking so that no liquid exits the vent valve even while the drinking bottle is being shaken.

Furthermore, the object of the invention is a bottle teat consisting of soft elastic material for a drinking bottle, in particular for infants and small children, comprising:

- a teat flange,
- a hollow teat sleeve that projects upward from the teat flange and is connected at its bottom end to the teat flange,
- a hollow suction part that is connected at its bottom end to the top end of the hollow teat sleeve and projects upward therefrom,
- at least one drinking hole in the suction part that extends from the outside to the inside of the suction part, characterized in that
- the teat flange has a cross-section in the shape of a T-profile, wherein the upright of the T-profile is aligned horizontally, and the two legs of the T-bar are arranged on the outer edge of the nipple flange and project upward and downward.

Preferably, this invention is another embodiment of the aforementioned inventions. This also applies to the special embodiments of the present invention provided below. The above invention enables particularly reliable and pull-out resistant fixation of the bottle teat on the edge of the mouth of a drinking bottle by means of a fastening ring.

Furthermore, the object of the invention is a bottle teat family comprising a plurality of bottle teats according to one of claims 1 to 15, wherein the bottle teats are designed such that the teat flanges have the same geometries and dimensions such that the bottle teats with differently designed drinking holes (bottle teats of different sizes) can optionally be fastened to the same drinking bottle. According to one preferred embodiment, the elevated surfaces have the same arrangement with regard to the teat flange in all bottle teats of the bottle teat family. According to another preferred embodiment, the elevated surfaces of bottle teats of different sizes of the bottle teat family have the same dimensions. This makes it possible to sealingly cover bottle teats of different sizes from the bottle teat family using the same caps.

In addition, the object is achieved by a cap for a drinking bottle, in particular for infants and small children, having some or all of the features described herein. Advantageous embodiments of the cap are described herein.

The cap according to the invention for a drinking bottle, in particular for infants and small children, has:

- a peripheral cap side wall,
- at lease one retaining element on the bottom edge of the side wall for releasably retaining the cap on a drinking bottle,
- a cap bottom connected to the top edge of the cap sidewall, characterized in that
- the cap bottom has an inwardly bulging peak region in the center on the inside, and
- an inwardly bulging sealing surface adjacent to the peak region and surrounding it,
- wherein the radii of curvature in the peak region are the same size or smaller than the radii of curvature in the region of the sealing surface such that a bottle teat with a suction part with an elevated surface bulging to the outside and having at least one drinking hole can be positioned on the sealing surface to seal a dome-shaped palate-contacting region.

The cap according to the invention makes it possible to very easily and reliably find the reliably sealing sealing position of the elevated surface on the sealing surface of the cap. The correct positioning of the elevated surface on the sealing surface is not impaired by frictional contact between the suction part and peak region. The inwardly bulging peak region and the inwardly bulging sealing surface both bulge into the cap bottom.

According to the one design of the invention, the cap bottom has a first concavity from above which in turn has a second concavity from below, wherein the second concavity on the inside encompasses the inwardly bulging peak region, and the inwardly bulging sealing surface surrounding the peak region. This is advantageous for easily finding the reliably sealing sealing position. Contact is thereby largely avoided between the peak region and the suction part.

According to another embodiment, the retaining element is a latching projection on the inside of the cap sidewall. The at least one latching projection makes it possible to lock the cap in sealing position on the fastening ring.

According to another design, the bottle teat is inserted in a fastening ring with at least one fastening element to be releasably held on the edge of the mouth of a drinking bottle.

According to another design, the fastening ring has a latching groove in the top edge for snapping latching projections on a cap.

According to another design, the fascinating ring has a peripheral inner thread on the inside for being screwed onto an outer thread on the outside of the mouth of a drinking bottle.

According to another design, the fastening ring has a peripheral groove in the bottom surrounding a central through-hole for the teat sleeve of the bottle teat in which the upwardly projecting leg of the T-bar of the teat flange is inserted.

According to another embodiment of the present invention, the bottle teat has a peripheral, drawn-in region between the hollow teat sleeve and teat flange. The drawn-in region makes it possible to preinstall the bottle teat on the fastening ring. The preinstalled assembly can be fastened very easily and reliably to the edge of the mouth of a drinking bottle.

According to another design, the drawn-in region is bordered at the top by an approximately horizontal, bottom sleeve edge of the hollow teat sleeve. The teat sleeve can thereby be brought into close contact with the top edge of a fastening ring.

Furthermore, the object of the invention is a drinking bottle consisting of plastic, in particular for infants and small children, comprising:

- a bottle body with a bottle bottom and a bottle sidewall and a chamber surrounded thereby for receiving liquid food
- a bottleneck at the top end of the bottle sidewall,
- a bottle neck that surrounds a mouth of the drinking bottle,
- an outer thread on the outside of the bottle neck for screwing on a fastening ring, characterized in that
- The bottle neck on the outside of the edge surrounding the mouth has a peripheral outer step, wherein a bottle teat with a teat flange with a downwardly projecting leg on the outer edge of the teat flange can be inserted into the outer step and pressed against the edge of the mouth by means of the fastening ring.

Preferably, this invention is another embodiment of the aforementioned inventions. By arranging the downwardly projecting leg in the mouth of the outer step and fixing the teat flange on the edge of the mouth by means of the fastening ring, the teat flange is secured in a particularly reliable manner between the drinking bottle and fastening ring. According to one preferred design, the downwardly projecting leg of the teat flange is the downwardly projecting leg of a T-bar which, with an upwardly projecting leg, engages in a groove in the fastening ring.

According to another design of the present invention, the bottle teat is held on the mouth of a drinking bottle, wherein the teat flange is pressed by the fastening ring against the edge of the mouth of the feeding bottle.

According to another embodiment, a cap is releasably held on the fastening ring, and the sealing surface of the cap lies sealingly against the elevated surface of the bottle teat. This yields a seal that is particularly easy to produce and reliable. The cap is preferably held in a specific position on the fastening ring dictated by retaining elements.

Therefore, according to a preferred design, the cap is latched with at least one latching projection in a latching groove of the fastening ring.

The invention is explained in greater detail below based on the appended drawings of an exemplary embodiment. In the drawings.

Figure 1:
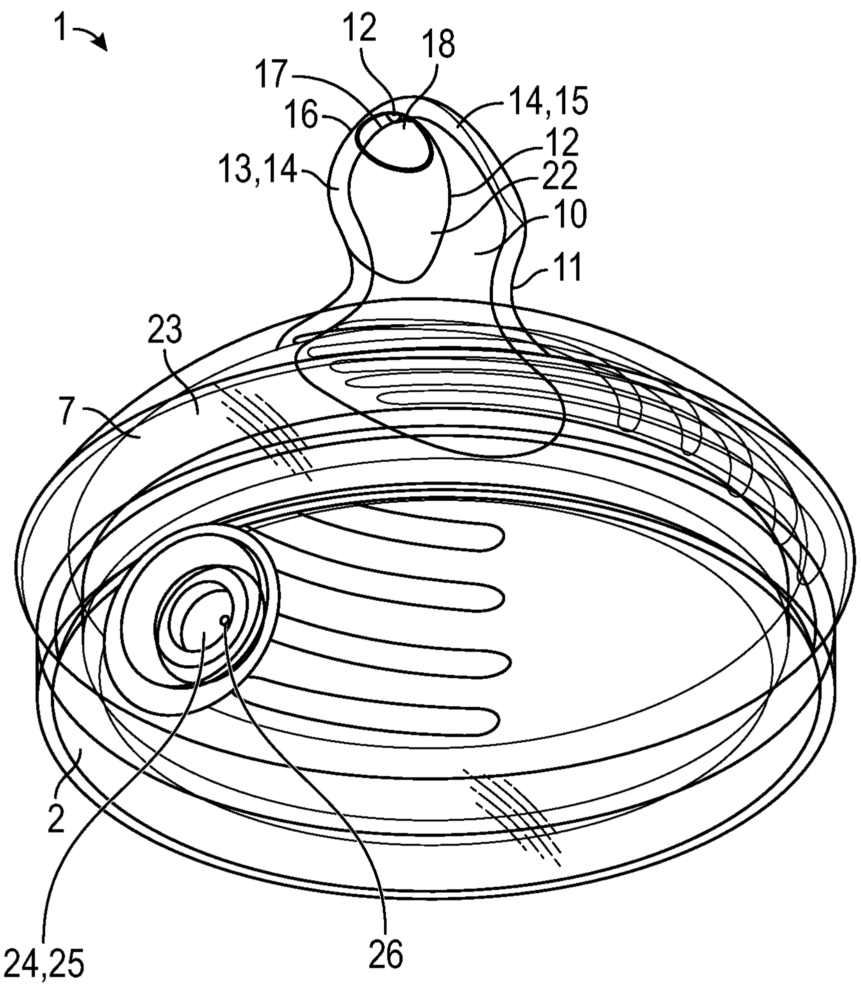
FIG. 1-7 show a bottle teat in a perspective view, front and rear view, left and right side view, plan view and bottom view.
Figure 2:
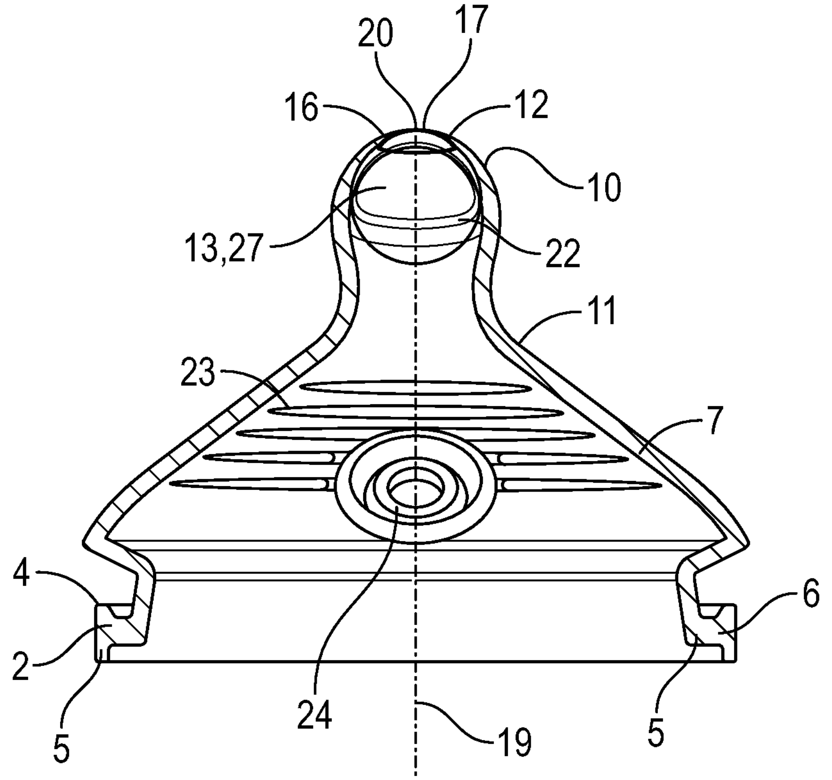
Figure 3:
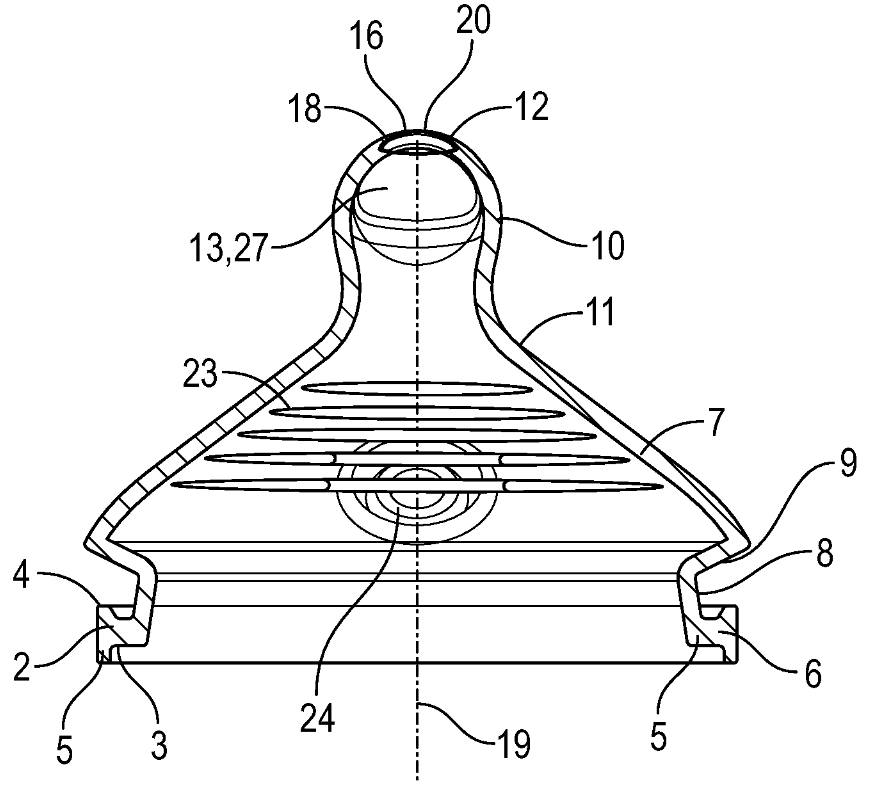
Figure 4:
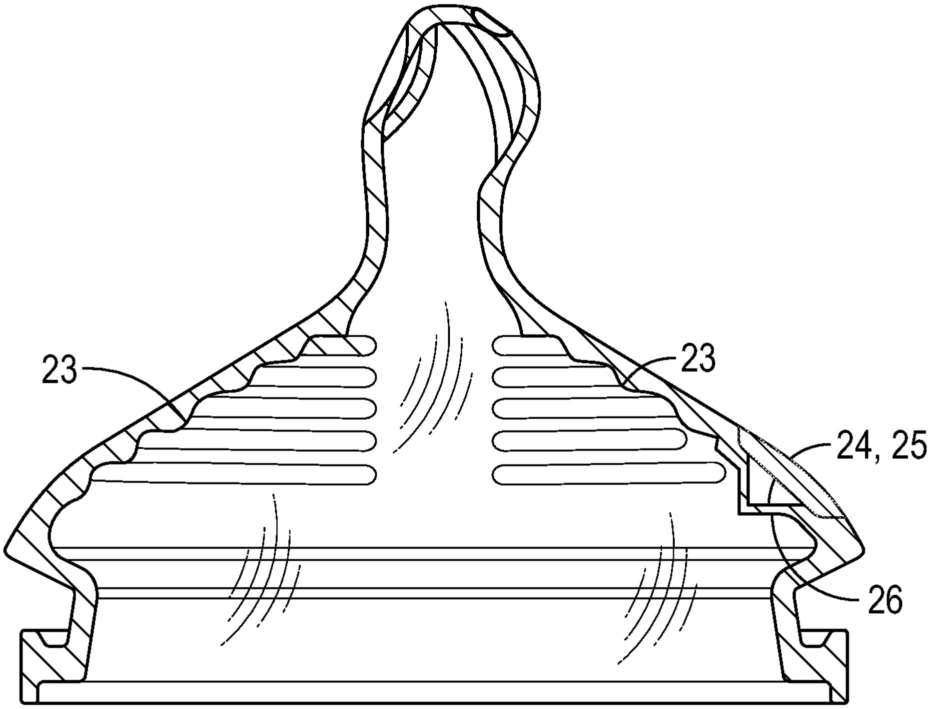
Figure 5:
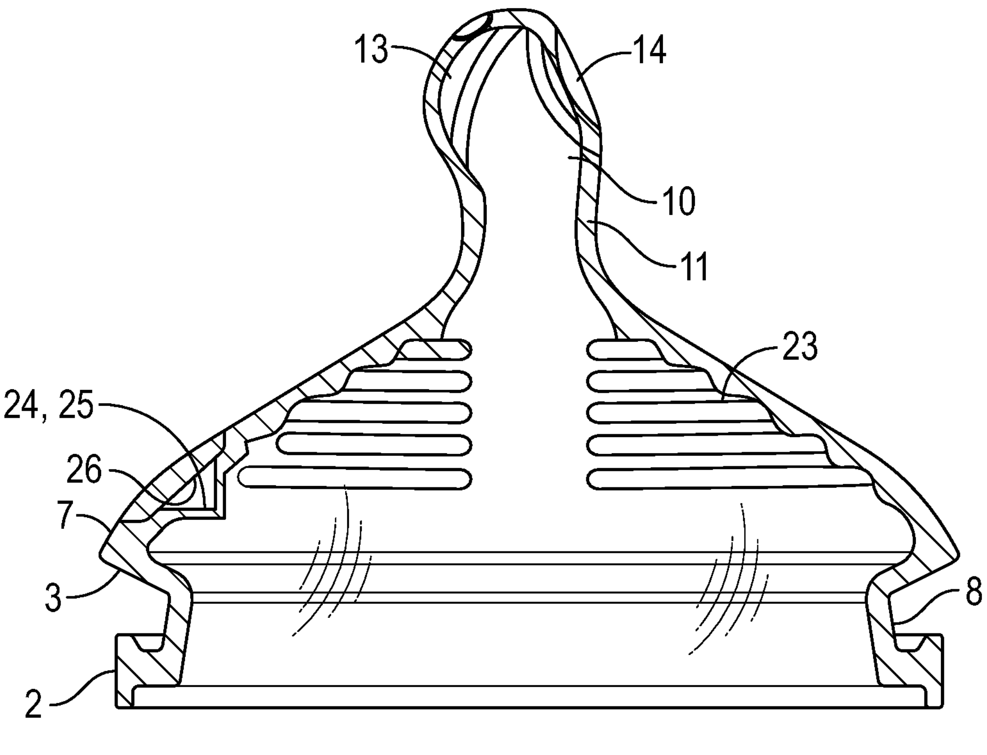
Figure 6:
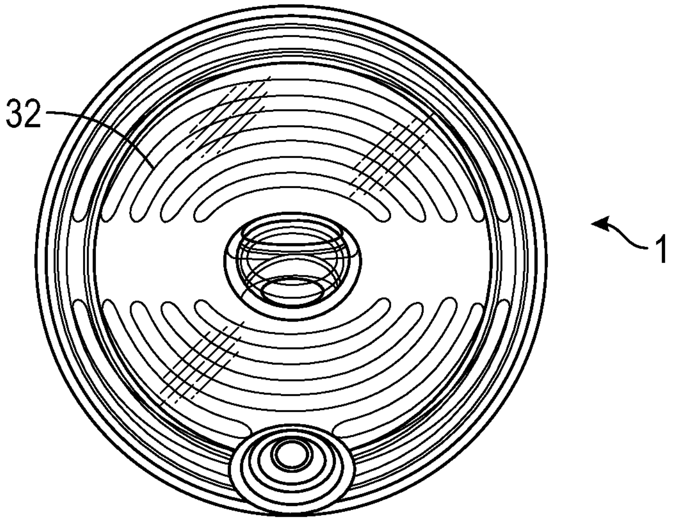
Figure 7:
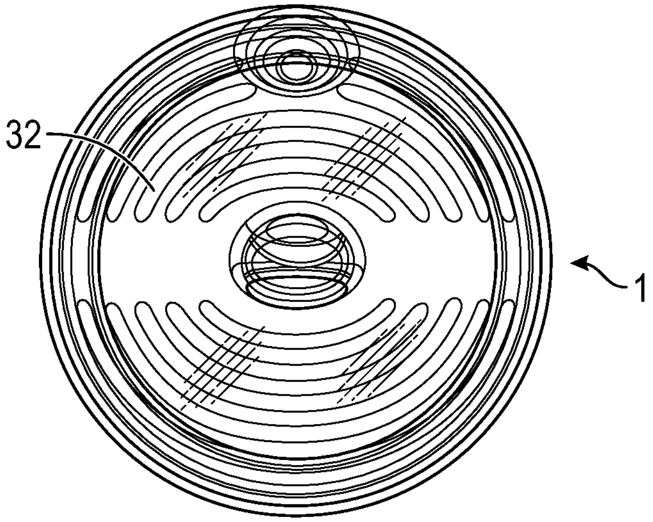
Figure 8:
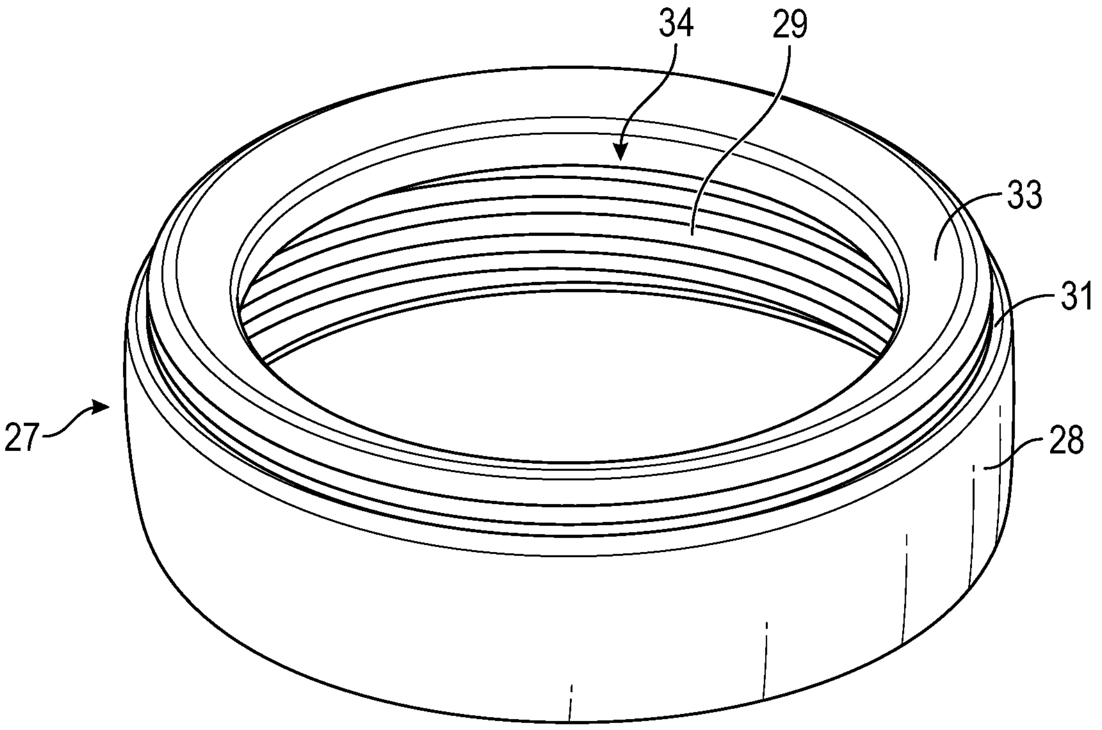
FIG. 8-11 show a fastening ring in a perspective view, side view, plan view and bottom view.
Figure 9:
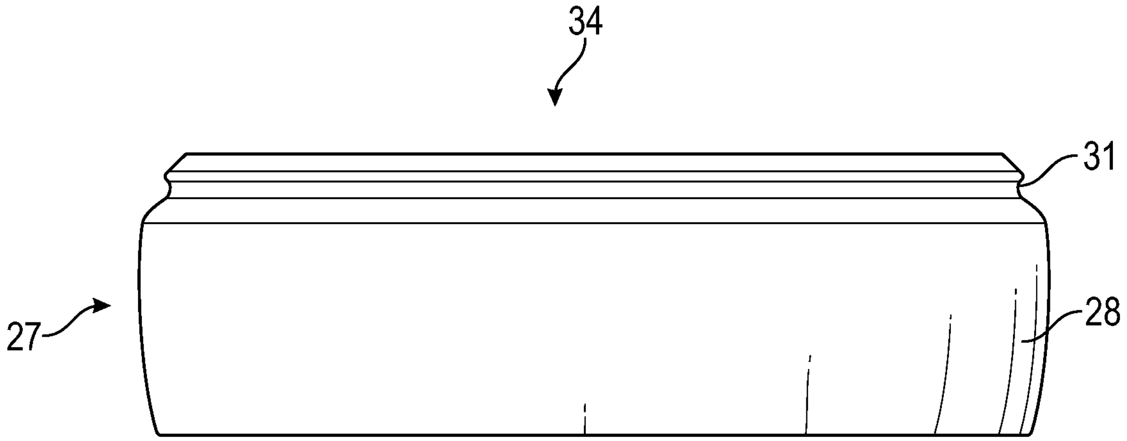
Figure 10:
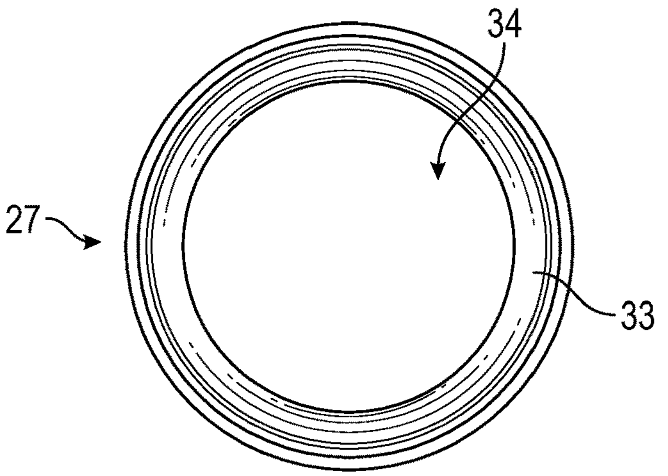
Figure 11:
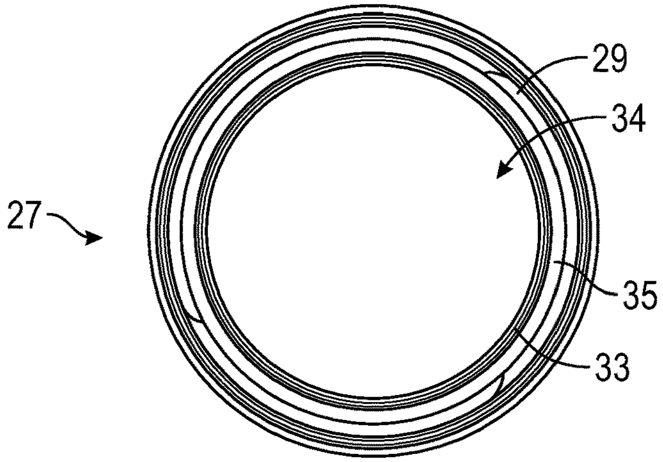
Figure 12:
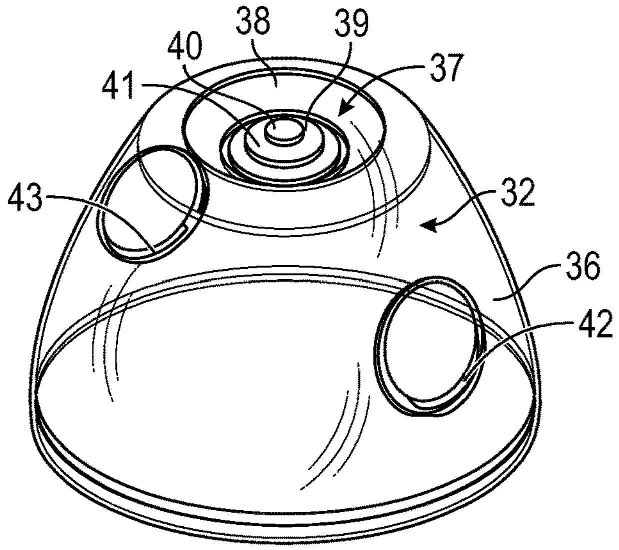
FIG. 12-18 show a cap in a perspective view, front and rear view, left and right side view, plan view and bottom view.
Figure 13:
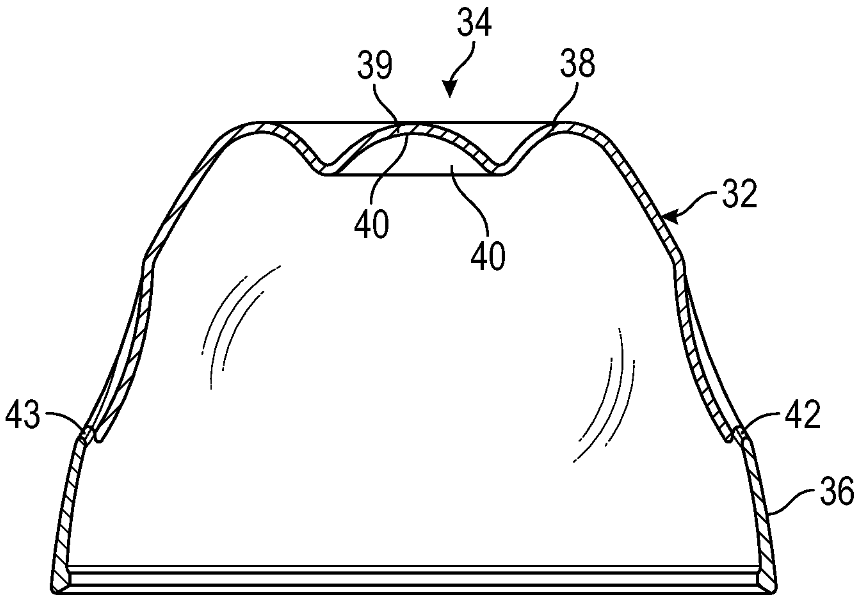
Figure 14:
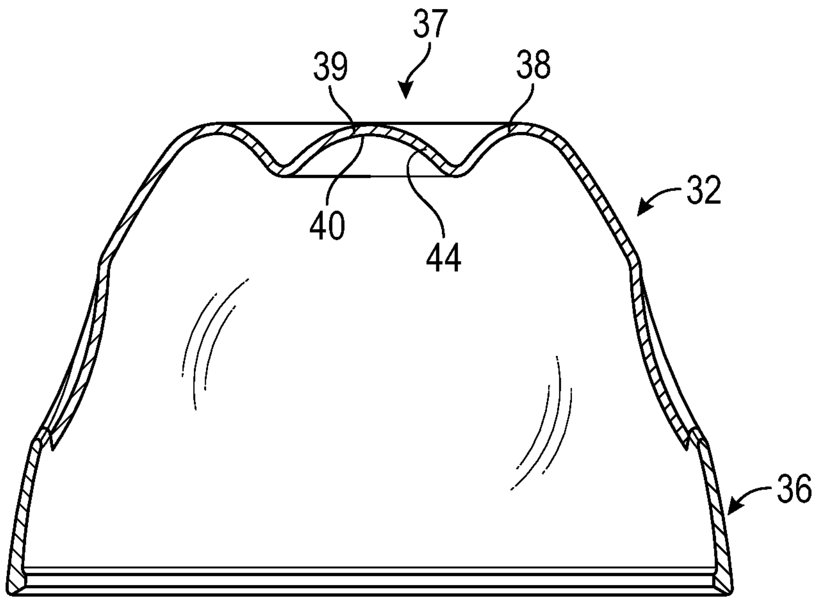
Figure 15:
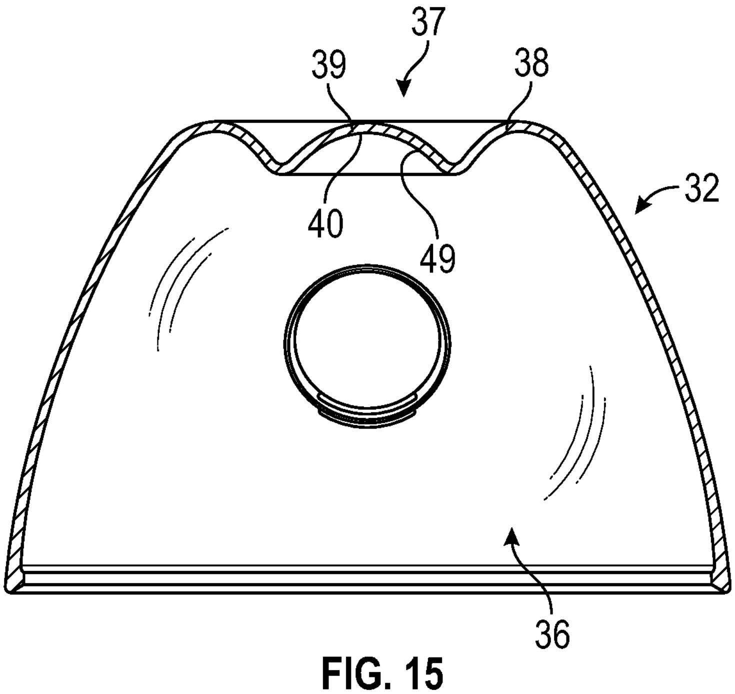
Figure 16:
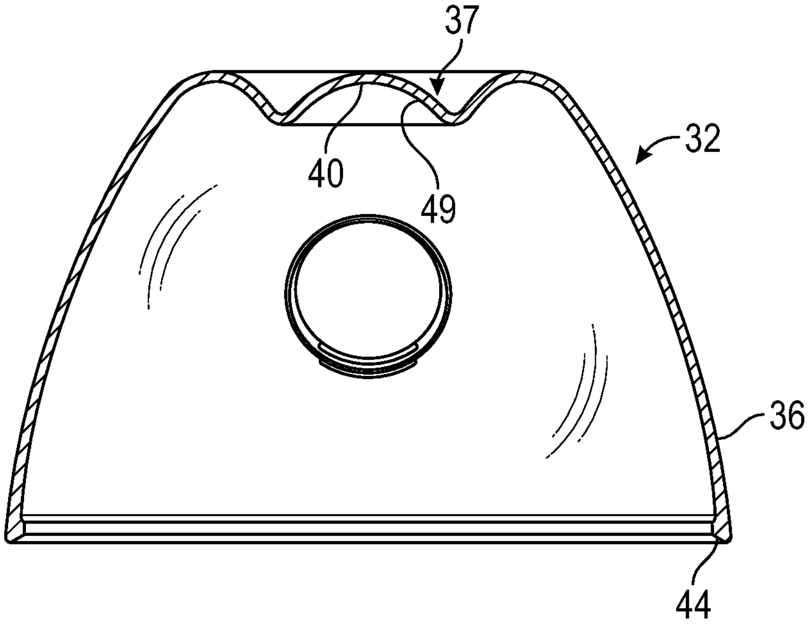
Figure 17:
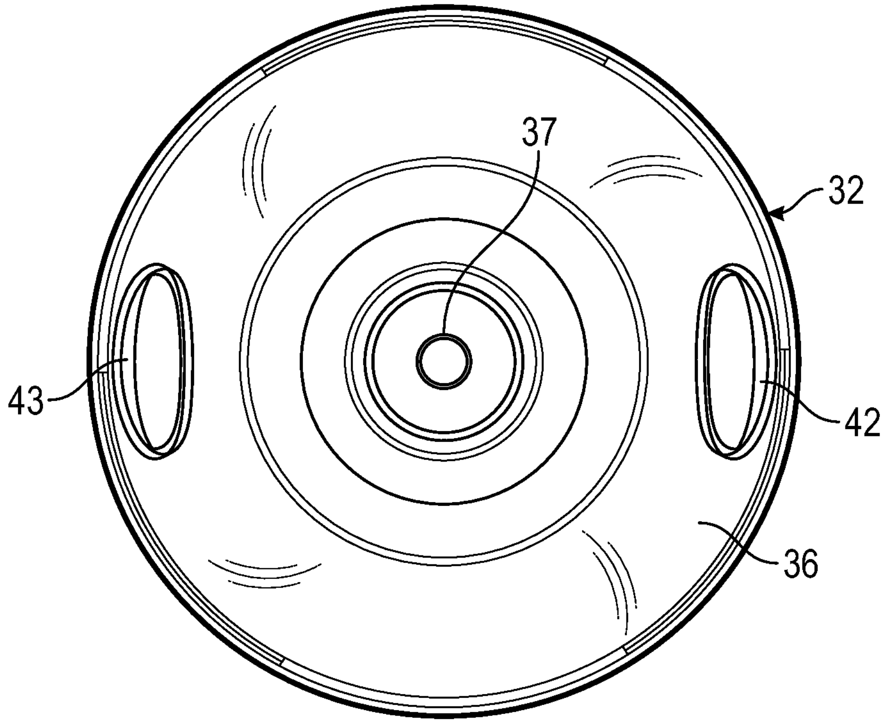
Figure 18:
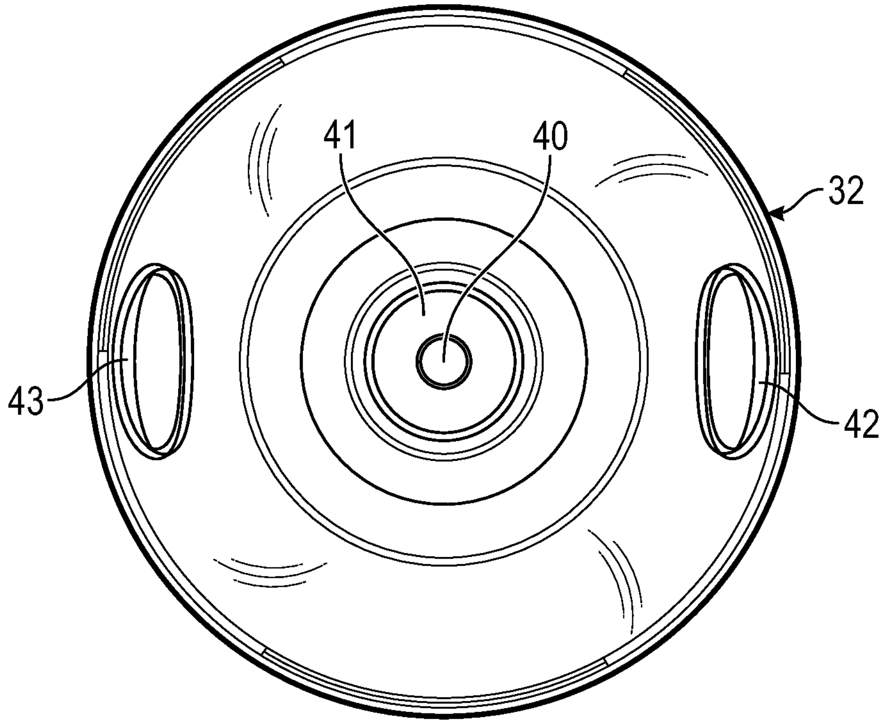
Figure 20:
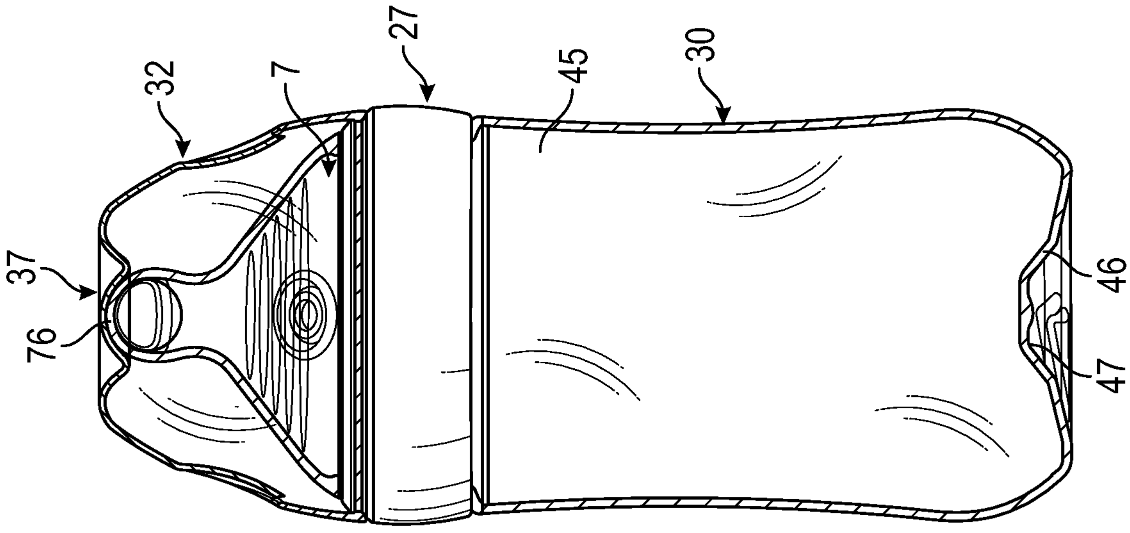
FIG. 19-25 show a drinking bottle with a bottle teat, fastening ring and cap mounted thereupon in a perspective view, front and rear view, left and right side view, plan view and bottom view.
Figure 19:
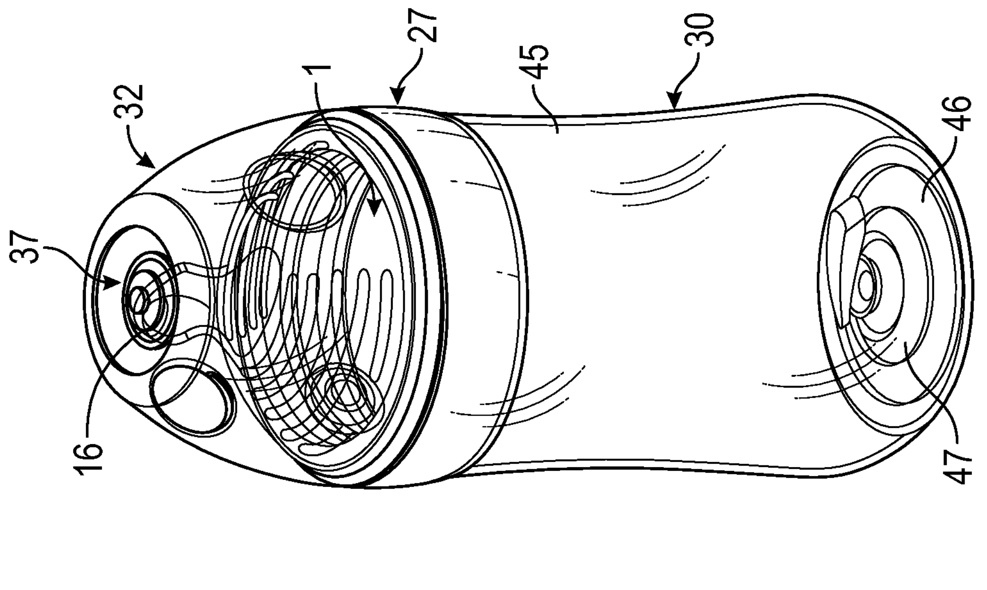
Figure 22:
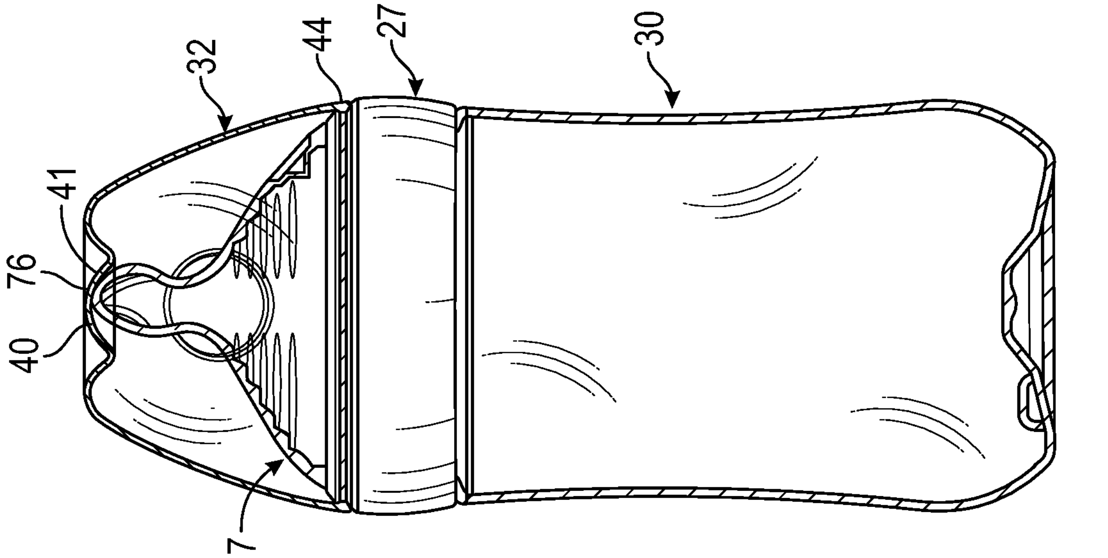
Figure 21:
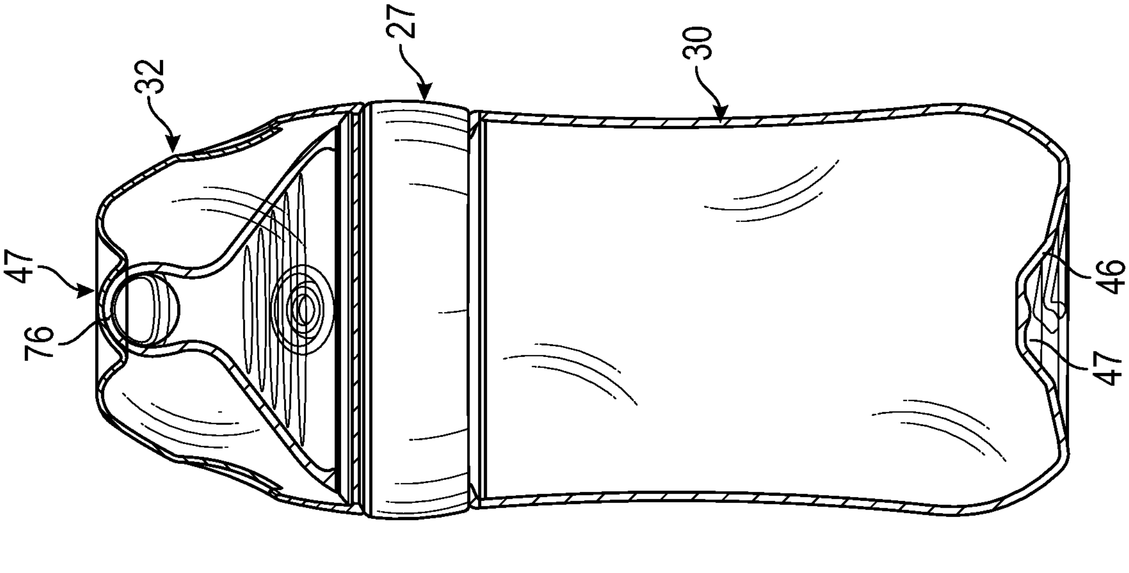
Figure 23:
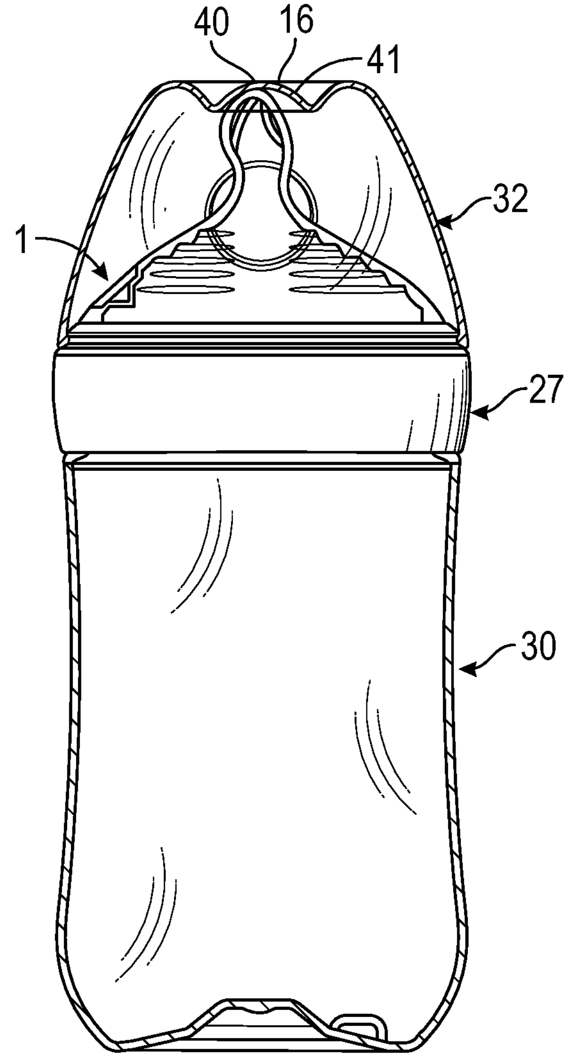
Figure 24:
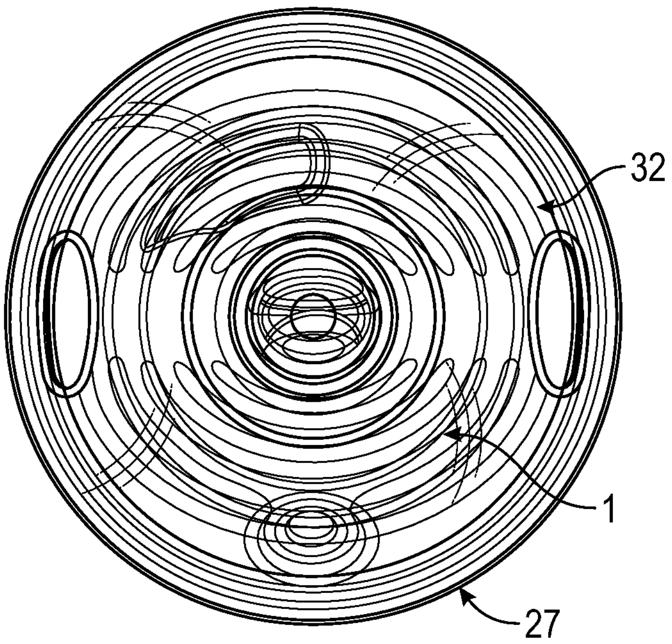
Figure 25:
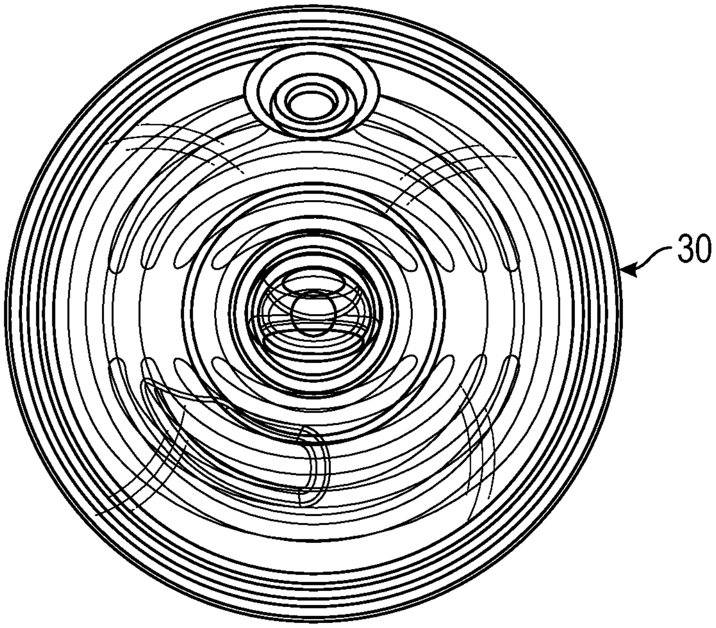
Figure 26:
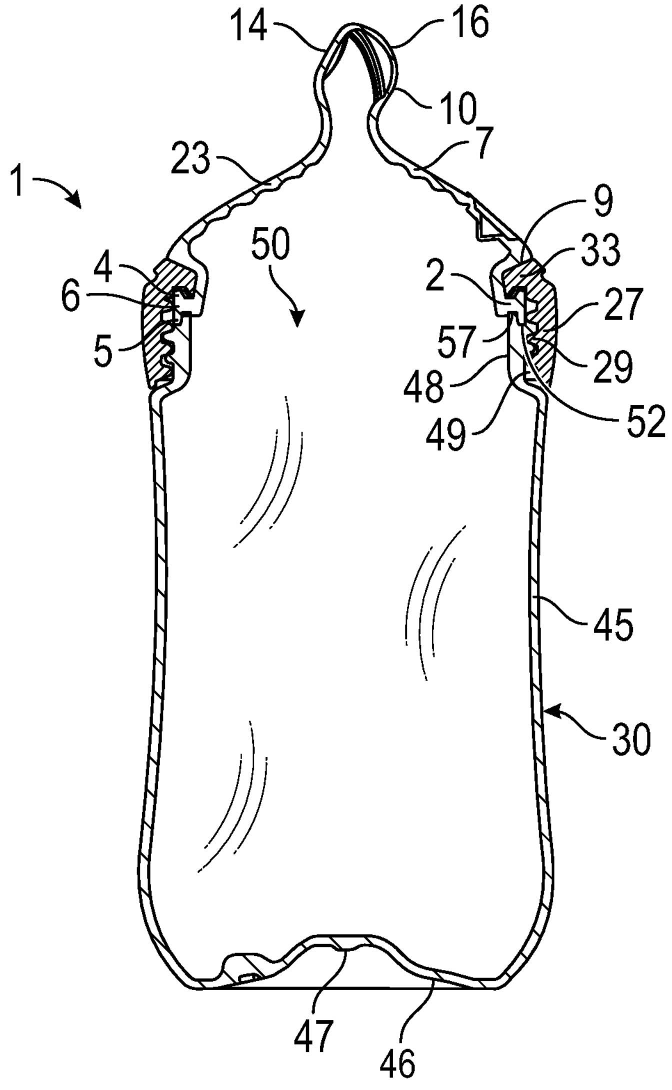
FIG. 26 shows a vertical section of the drinking bottle with a bottle teat and fastening a ring mounted thereupon.

In the present application, the terms “top” and “bottom”, “horizontal” and “vertical” refer to the alignment of the bottle teat, the cap, the fastening ring and the drinking bottle with the teat flange in a horizontal plane and the suction part above the teat flange.

According to FIGS. 1 to 7, the bottle teat 1 has a teat flange 2 with a T-profile in cross section. The T-profile has a horizontally aligned upright 3. The two legs 4, 5 of the T-bar 6 are arranged on the outer edge of the teat flange 2 and project upward and downward.

Furthermore, the bottle teat 1 has a hollow teat sleeve 7 that is connected at its bottom end to the inner circumference of the teat flange 2. The teat sleeve 7 projects upward from the teat flange 7.

Adjacent to the teat flange 2, the teat sleeve has a peripheral drawn-in region 8. Above that, it has a drinking sleeve edge 9 that projects outwardly approximately horizontally. On the outer perimeter of the sleeve edge 9, the teat sleeve 7 has its maximum outer diameter. Above that, the teat sleeve 7 has a shape that gradually tapers upward.

At its top end, the teat sleeve 7 is connected to the bottom end of a hollow suction part 10. The suction part 10 projects upward from the teat sleeve 7.

At the connecting region between the teat sleeve 7 and suction part 10, the bottle teat 1 has a waist 11. Above that, the suction part 10 has a teat head 12. One side of the teat head 12 forms a dome-shaped palate-contacting region 13.

On the side opposite the palate-contacting region 13, the suction part 10 has a tongue contacting region 14 comprising a bevel 15. The bevel 15 is mainly flat but dented inward slightly. The bevel 15 has an approximately elliptical contour, wherein the main axis of the ellipse is parallel to a midplane through the suction part 10, and the minor axis is aligned perpendicular thereto. This is the midplane on the one side of which the palate-contacting region 13 is arranged, and on the other side of which the tongue-contacting region 14 is arranged.

The cross section of the suction part 10 has larger dimensions in the direction of the main axis than in the direction of a minor axis perpendicular thereto. The main axis lies in the mid-plane of the suction part 10. Preferably, the suction part also has an oval cross section in the region of the waist 11.

An outwardly bulging, elevated surface 16 is on the outside of the palate-contacting region 13. One or more drinking holes 17 are formed in the elevated surface 16 and extend from the outside of the suction part 10 to the inside of the suction part 10. Preferably, the drinking holes 17 are produced by means of a laser beam.

The elevated surface 16 has a contour 18 in the shape of an ellipse, the main axis of which is aligned perpendicular to the mid-axis 19 of the teat 2. The elevated surface 16 is arranged adjacent to the peak 20 of the suction part 10, i.e., adjacent to the point of the suction part 10 that has the maximum distance from a plane through the teat flange 2.

Figure 27:
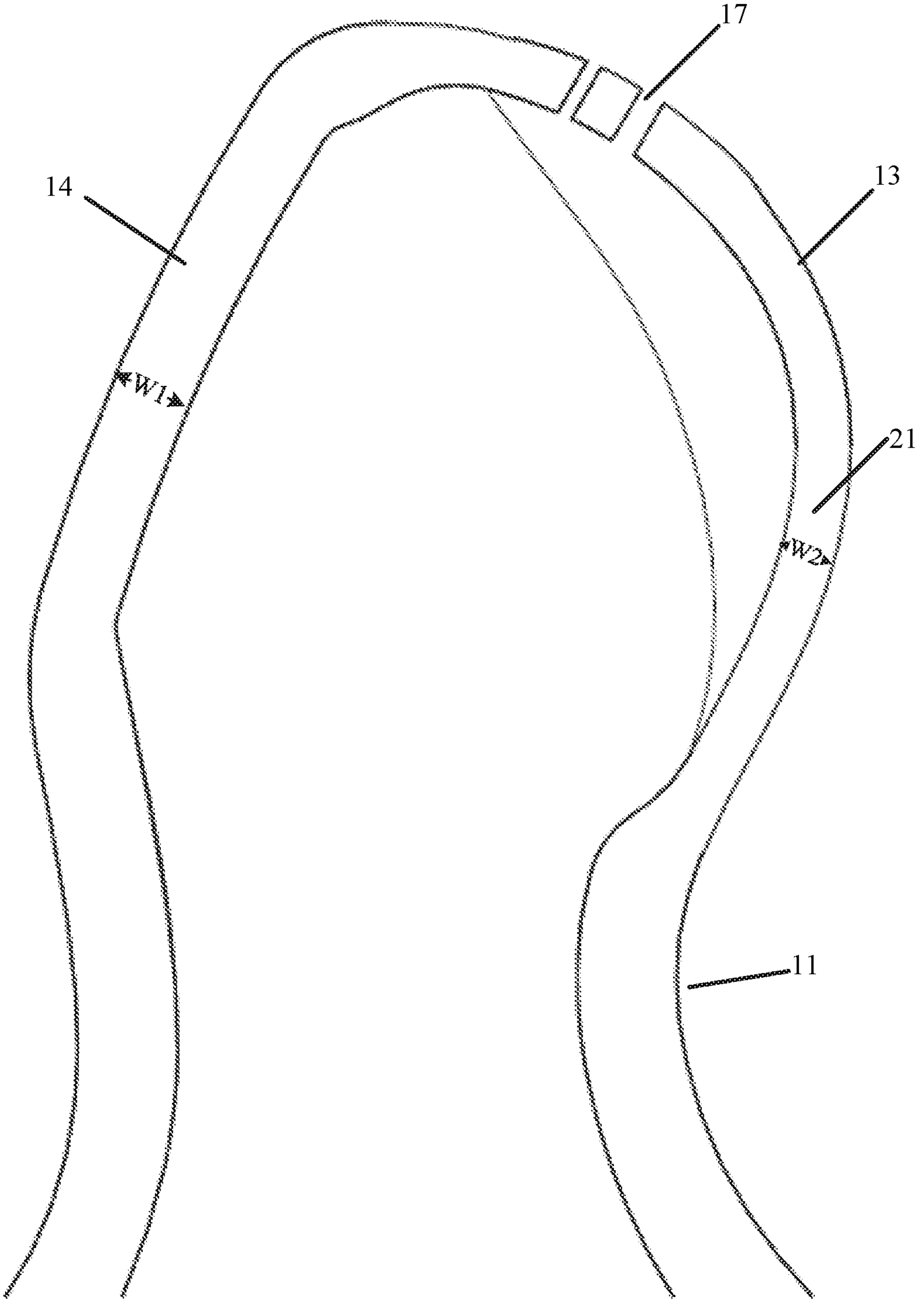
FIG. 27 is a partial, cross-sectional view of the bottle teach.

Moreover, the palate-contacting region 13 is configured as the thin region 21. In the palate-contacting region 13, the suction part 10 accordingly has a lesser wall thickness W2 than the wall thickness W1 in its other regions, as shown in FIG. 27. The thin region 21 has an approximately circular contour 22 that coincides with the contour of the palate-contacting region 13. The contour 22 extends from its highest point next to the peak 20 of the suction part 10 to its lowest point next to the waist 11.

The top edge of the elevated surface 16 touches a section of the top edge of the thin region 21.

The radii of curvature of the elevated surface 16 are less than the radii of curvature in the remaining palate-contacting region 13.

On the inside, the teat sleeve 7 has a plurality of inwardly projecting, parallel ribs 23 at a distance from each other around the midaxis 19 through the nipple flange 2. In a plan view, the ribs 23 each have an elliptical contour. The main axes coincide in the midplane through the suction part 10, and the minor axes of the ellipses are aligned perpendicular thereto.

The ribs 23 gradually flatten at opposing ends toward the midplane through the suction part 10.

The teat sleeve 7 has an approximately wavy contour (see FIG. 4, 5, 25) in a vertical section through the ribs 23 on the inside.

Furthermore, the teat sleeve 7 has a vent valve 24. The vent valve 24 is configured as an inwardly projecting cone valve 25. The cone valve has a slit 26 in its end.

The bottle teat 1 is preferably provided with three, six, or nine circular drinking holes 17. In addition or instead, elongated drinking slits can be provided in a straight, angled or curved shape.

The bottle teat 1 is made as a single part of silicone or thermoplastic elastomer, in particular through injection-molding. In a similar design, the bottle teat 1 can also be made of natural rubber.

According to FIGS. 8 to 11, the fastening ring 27 has a substantially cylindrical cover 28 with an inner thread 29 for being screwed onto the corresponding outer thread of a drinking bottle 30.

At the top on the outside of the cover 28, the fastening ring 27 has a peripheral latching groove 31 for snapping on a cap 32.

At the top, the fastening ring has an annular ring flange 33 that extends inward from the cover 28. The ring flange 33 borders a through-hole 34 for the bottle teat 1. At the bottom side of the ring flange 33, a groove 35 runs around the through-hole 34.

The fastening ring 27 is for example made of polypropylene or another hard elastic plastic.

The bottle teat 1 can be inserted into the fastening ring 27 by first guiding the suction part 10 and then the teat sleeve 7 through the through-hole 34 from below until the teat flange 2 engages in the drawn-in region 8, and the upstanding leg 4 of the T-bar 6 engages in a groove 35 in the bottom side of the ring flange 33. Then the bottle teat 1 lies against the top side of the teat flange with the bottom side of the sleeve edge 9.

According to FIGS. 12 to 18, a cap 32 has a peripheral cap sidewall 36 that narrows conically upward. Moreover, the cap 32 has a cap bottom 37 connected to the top edge of the cap sidewall 36.

In the cap bottom 37, there is a first concavity 38 from above that in turn has a second concavity 39 from below. On the inside, the second concavity 39 has an inwardly bulging peak region 40.

Furthermore, the second concavity 39 has an inwardly bulging sealing surface 41 surrounding the peak region 40.

The radii of curvature of the peak region 40 are the same size or smaller than the radii of curvature of the sealing surface 41.

In the cap sidewall 36, there are two diametrically opposed emergency breathing holes 42, 43.

Latching projections 44 project inward from the inside at the bottom edge of the cap sidewall 36.

The cap 32 is for example made of a hard elastic plastic, in particularly transparent plastic.

According to FIGS. 19 to 26, a drinking bottle 30 has a bottle body 45.

A bottle bottom 46 of the bottle body 45 has an upward bulge 47 in the center. In the example, the bottle body 45 is slightly waisted.

At the top, the bottle body 45 has a bottle neck 48 with an outer thread 49 on the outside.

The bottleneck 48 surrounds a mouth 50 with an edge 51 of the drinking bottle 30.

Above the outer thread 49, the bottleneck 48 has an outer step 52 surrounding the mouth 50 on the outside.

The bottle 30 is for example made of a hard elastic plastic, in particularly transparent plastic.

The preassembled combination consisting of the fastening ring 27 and bottle teat 1 can be screwed onto the outer thread 48 of the drinking bottle 30. The downward-projecting leg 5 of the teat flange 2 engages in the outer step 52 and applies the bottom side of the teat flange 2 on the top edge 51 of the mouth 50. By screwing tight the fastening ring 5 27, the teat flange 2 is clamped between the fastening ring 27 and the edge 51 of the mouth 50. In so doing, the bottle teat 1 is additionally secured by the legs 4, 5 of the T-bar 6 captured in the groove 35 and the outer step 52.

The cap 32 can be placed on this arrangement. In so doing, the contact between the 10 suction part 10 and cap 32 can be limited to the elevated surface 16 and the sealing surface 41. Accordingly, the suction part 10 is introduced with little friction and precisely reaches the sealing position intended for it. The sealing position is reached when the latching projections 44 are snapped into the latching groove 31. Overall, a drinking bottle is thereby achieved that is very effectively protected against the 15 unintentional leakage of liquid.

The invention claimed is:

1. A bottle teat comprising a soft elastic material for a drinking bottle the bottle teat further comprising:

a teat flange;

a hollow teat sleeve that projects upward from the teat flange and is connected at a sleeve bottom end to the teat flange;

a hollow suction part that is connected at a suction part bottom end to a top end of the hollow teat sleeve and projects upward therefrom;

a plurality of inwardly projecting parallel ribs disposed on an inside surface of the hollow teat sleeve, wherein each parallel rib of the plurality of inwardly projecting parallel ribs defines a first end and a second end opposing the first end, and wherein each parallel rib transitions to flat at the first end and the second end;

a dome-shaped palate-contacting region on a palate-facing side of the suction part;

a bevel on the tongue-contacting region disposed opposite the palate-contacting region on the suction part;

at least one drinking hole in the palate-contacting region that extends from an outside to an inside of the suction part;

an outwardly bulging, elevated surface disposed on an outside of the palate contacting region; and wherein the at least one drinking hole is arranged on the elevated surface so that the suction part with the elevated surface is configured to be pressed in a sealing manner against a sealing surface that bulges inward on an inside of a cap bottom of a cap to cover the bottle teat.

2. The bottle teat according to claim 1, inserted in a fastening ring to be releasably held on the edge of the mouth of a drinking bottle.

3. The bottle teat according to claim 2, wherein the fastening ring has a latching groove on the top edge for snapping latching projections on a cap.

4. The bottle teat according to claim 2, wherein the fastening ring has a peripheral groove in the bottom surrounding a central through-hole for the teat sleeve in which the upwardly projecting leg of a T-bar of the teat flange is inserted.

5. The bottle teat according to claim 2, wherein the fastening ring is held on the mouth of a drinking bottle, and the teat flange of the fastening ring is pressed against the edge of the mouth.

6. The bottle teat according to claim 5, wherein the drinking bottle has an outer step surrounding the mouth into which the downwardly projecting leg of a T-bar of the teat flange engage.

7. The bottle teat according to claim 2, wherein a cap is releasably held on the fastening ring, and the sealing surface of the cap lies sealingly against the elevated surface of the bottle teat.

8. The bottle teat according to claim 7, wherein the cap is latched with at least one latching projection in a latching groove of the fastening ring.

9. A bottle teat for a drinking bottle, the bottle teat comprising:

a teat flange;

a hollow teat sleeve that projects upward from the teat flange and is connected at a sleeve bottom end to the teat flange;

a hollow suction part that is connected at a suction part bottom end to a top end of the hollow teat sleeve and projects upward therefrom;

a plurality of inwardly projecting parallel ribs disposed on an inside surface of the hollow teat sleeve, wherein each parallel rib of the plurality of inwardly projecting parallel ribs defines a first end and a second end opposing the first end, and wherein each parallel rib transitions to flat at the first end and the second end;

a dome-shaped palate-contacting region on a palate-facing side of the suction part;

a bevel on the tongue-contacting region disposed opposite the palate-contacting region on the suction part; and at least one drinking hole in the palate-contacting region that extends from an outside to an inside of the suction part;

wherein the bottle teat is configured to be inserted in a fastening ring that is releasably held on the edge of the mouth of a drinking bottle.

10. The bottle teat of claim 9, further comprising:

an outwardly bulging, elevated surface disposed on an outside of the palate contacting region;

wherein the at least one drinking hole is arranged on the elevated surface so that the suction part with the elevated surface is configured to be pressed in a sealing manner against a sealing surface that bulges inward on an inside of a cap bottom of a cap to cover the bottle teat.

11. The bottle teat of claim 9, wherein the fastening ring has a latching groove on a top edge for snapping latching projections on a cap.

12. The bottle teat of claim 9, wherein the fastening ring has a peripheral groove in the bottom surrounding a central through-hole for the teat sleeve in which the upwardly projecting leg of a T-bar of the teat flange is inserted.

13. The bottle teat of claim 9, wherein the fastening ring is held on the mouth of a drinking bottle, and the teat flange of the fastening ring is pressed against the edge of the mouth.

14. The bottle teat of claim 9, wherein the drinking bottle has an outer step surrounding the mouth into which the downwardly projecting leg of a T-bar of the teat flange engage.

15. The bottle teat of claim 9, wherein a cap is releasably held on the fastening ring, and the sealing surface of the cap lies sealingly against the elevated surface of the bottle teat.

16. The bottle teat of claim 15, wherein the cap is latched with at least one latching projection in a latching groove of the fastening ring.

* * * * *